United States Patent [19]
Yamada

[11] Patent Number: 5,435,711
[45] Date of Patent: Jul. 25, 1995

[54] TEMPERATURE CONTROL DEVICE FOR A HOT NOZZLE USED IN A RUNNERLESS MOLDING PROCESS

[76] Inventor: Fujio Yamada, 48, Toei 3-chome, Chiryu-shi, Aichi-ken, Japan

[21] Appl. No.: 167,040

[22] Filed: Dec. 16, 1993

[30] Foreign Application Priority Data

Dec. 18, 1992 [JP] Japan .................................. 4-356022

[51] Int. Cl.⁶ .............................................. B29C 45/78
[52] U.S. Cl. ..................... 425/143; 264/406; 264/328.15; 425/144; 425/549
[58] Field of Search ....................... 425/143, 144, 549; 264/328.15, 40.6

[56] References Cited

U.S. PATENT DOCUMENTS

Re. 31,903  6/1985  Failace ................. 425/144
4,480,981  11/1984  Togawa et al. ....... 425/144
4,648,833  3/1987  Yamada .
4,882,469  11/1989  Trakas .

FOREIGN PATENT DOCUMENTS 3407894  9/1985  Germany .

OTHER PUBLICATIONS

Patent abstract of Japan, vol. 11, No. 31 (M-663), 1 page, of Jan. 29, 1988.

*Primary Examiner*—Tim Heitbrink
*Attorney, Agent, or Firm*—Dennison, Meserole, Pollack & Scheiner

[57] ABSTRACT

A temperature control system for a hot nozzle is used in a runner-less molding process of a plastic by an injection molding machine. The control system includes first and second temperature detecting devices for detecting the temperature of the hot nozzle at the front end of the hot nozzle and at a position upstream of the front end, respectively. Control signal outputting units compare the temperature detected by the first and second temperature detecting devices with a first set temperature and a second set temperature, respectively. Based on the temperature differences, first and second control signals corresponding to the temperature differences are calculated and are outputted from the control signal outputting units to a power supply unit which is connected to a power source for regulating the power for heating the hot nozzle. A switch is connected between the control signal outputting units and the power supply unit and is operable to selectively supply either one of the first and second temperature control signals to the power supply unit according to the molding cycle.

8 Claims, 2 Drawing Sheets

TEMPERATURE CONTROL DEVICE FOR A HOT NOZZLE USED IN A RUNNERLESS MOLDING PROCESS

BACKGROUND OF THE INVENTION

1. Field of the Invention

The present invention relates to a temperature control system and a temperature control method for a hot nozzle used in a runner-less injection molding process of a plastic.

2. Description of the Prior Art

The applicant of the present application has proposed an improved hot nozzle in U.S. Pat. No. 4,648,833. The hot nozzle proposed in this U.S. patent does not require an external heater and can be rapidly heated or cooled in a short time. The nozzle includes a nozzle portion and a base portion. The nozzle portion is adapted to be inserted into a bore of a mold which is formed in communication with a mold cavity. The base portion serves to provide communication with the nozzle portion for the flow of molten resin injected from an injection molding machine. A pair of longitudinal slits extend over the length of the nozzle except a front end of the nozzle portion. Electric current is applied between both ends of the base portion divided by the slits, so that the nozzle portion is heated by itself.

However, in the practical application of the hot nozzle to the injection molding process, the front end of the nozzle is liable to be influenced by the temperature of the mold since the front end normally contacts the mold during the molding process. Further, the hot nozzle is formed of a relatively thin metal material and has a relatively small heat capacity. This may cause a temperature difference between the front end and a part of the nozzle on the side of the base portion. Particularly, when the mold is cooled to take out the molded product, the molten resin is solidified in the front end, so that no further injection process can be performed. Thus, the hot nozzle involves the problem that it is very difficult to control its temperature.

SUMMARY OF THE INVENTION

It is, accordingly, an object of the present invention to provide a temperature control system for a hot nozzle which is operable to reliably control the temperature of the hot nozzle.

It is another object of the present invention to provide a temperature control system for a hot nozzle which is operable to supply an appropriate heating current according to various steps in the molding cycle, so that the molded product has an excellent quality.

According to the present invention, there is provided a temperature control system for a hot nozzle for use in a runner-less molding process of a plastic by an injection molding machine, the hot nozzle including a nozzle portion adopted to be inserted into a bore formed in a mold and communicating with a mold cavity, a base portion for the flow of a molten resin of the plastic from the injection molding machine to the nozzle portion, the hot nozzle being divided substantially into two sections by a pair of slits which extend over the length of the hot nozzle except the front end of the nozzle portion, so that the nozzle portion can be heated through application of electric power between both sides of the base portion separated by the slits, comprising:

a first temperature detecting device for detecting the temperature of the hot nozzle at the front end thereof;

a second temperature detecting device for detecting the temperature of the hot nozzle at a position upstream of the front end;

control signal outputting units for comparing the temperature detected by the first and second temperature detecting devices with a first set temperature and a second set temperature, respectively, and for outputting first and second control signals corresponding to the temperature differences therebetween, respectively;

a power supply unit connected to the control signal outputting units for supplying, to the base of the hot nozzle, a power for heating the hot nozzle in response to the first and second control signals; and a switch connected between the control signal outputting units and the power supply unit and operable to selectively supply either one of the first and second temperature control signals to the power supply unit according to the molding cycle of the molding machine.

The invention will become more apparent from the appended claims and the description appended claims and the description as it proceeds in connection with the drawings.

DETAILED DESCRIPTION OF THE PREFERRED EMBODIMENT

An embodiment of the present invention will now be explained with reference to the accompanying drawings.

Figure 1:
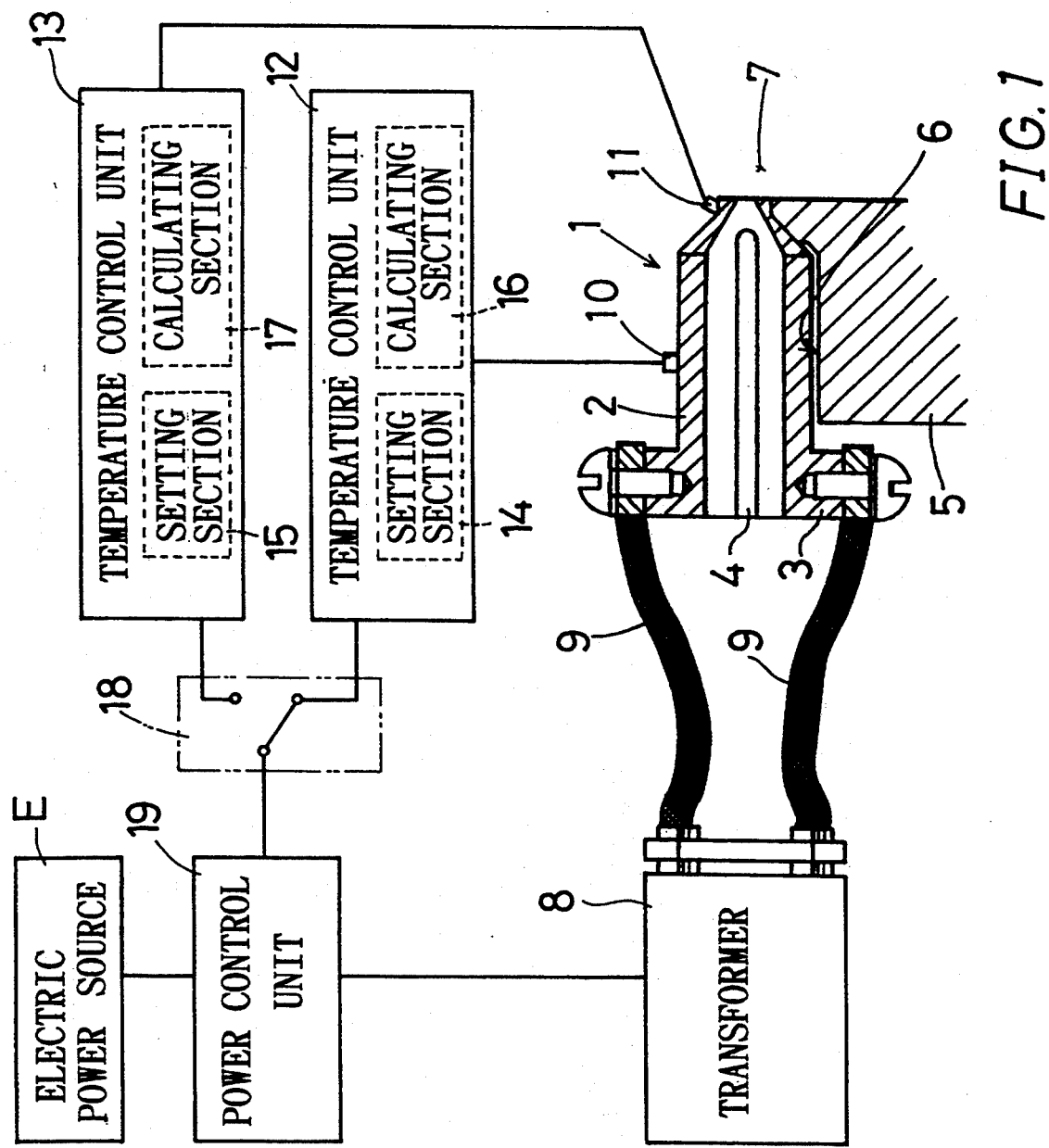
FIG. 1 is a schematic block diagram of a temperature control system, according to an embodiment of the present invention, for a hot nozzle used in a runner-less injection molding process.

Referring to FIG. 1, a temperature control system for a hot nozzle 1 is shown by a schematic block diagram. The hot nozzle 1 includes a nozzle portion 2 tapered at its front end and a base portion 3 formed integrally with the nozzle portion 2. The hot nozzle 1 is divided substantially into two parts by a pair of longitudinal slits 4 extending over the length of the hot nozzle 1 except the front end of the nozzle portion 2. The outer surface of the hot nozzle 1 is coated with a material (not shown) having both dielectric and adiabatic properties. The construction of the hot nozzle 1 is disclosed in detail in U.S. Pat. No. 4,648,833, and therefore, a more detailed explanation of the hot nozzle 1 is omitted. The nozzle portion 2 is inserted into a longitudinal bore 6 formed in a mold 5 in communication with a mold cavity 7, so that the front end of the nozzle portion 2 fronts on the cavity 7. The base portion 3 is connected to an injection nozzle (not shown) of an injection molding machine via a manifold, so that the molten resin injected from the injection molding machine enters the hot nozzle 1 via the manifold and is thereafter injected into the cavity 7. Lead wires 9 led from a transformer 8 are connected to the base portion 3 on both sides divided by the slits 4, so that the hot nozzle 1 is heated by the application of an electric power having low voltage and high current through the lead wires 9.

Thermocouples 10 and 11 are attached to the nozzle portion 2 of the hot nozzle 1 at a middle portion and the front end of the nozzle portion 2 in the longitudinal direction, respectively. The thermocouples 10 and 11 are connected to temperature control units 12 and 13, respectively. The temperature control units 12 and 13 include setting sections 14 and 15 operable by an operator for setting target temperatures (target temperatures Ta and Tb shown in FIG. 2(a)), respectively. The temperature control units 12 and 13 also include calculation sections 14 and 16 which are operable to compare the temperature detected by the thermocouples 10 and 11 with the target temperature and to obtain current signals (DC 4 to 20 mA) corresponding to the temperature differences therebetween through PID calculation process, respectively. The temperature control units 12 and 13 are connected to a power control unit 19 via a changeover switch 18. The changeover switch 18 is operable to selectively connect either one of the temperature control units 12 and 13 to the power control unit 19 such that one of the current signals from the calculation sections 14 and 16 of the temperature control units 12 and 13 is selectively inputted to the power control unit 19.

A primary voltage of AC 100 to 240 V is supplied from a power source E to the power control unit 19. The power control unit 19 regulates the primary voltage to a voltage corresponding to the temperature difference based on the selected one of the current signals through a phase control by means of a triac, etc. The voltage thus regulated is outputted to a transformer 8 which transforms the regulated voltage into an electric power having relatively low voltage and relatively high current appropriate for supply to the base portion 3 of the hot nozzle 1 for heating the same. Preferably, the power control unit 19 includes a converter for converting the power to be supplied to the transformer 8 into power having high frequency, so that the transformer 8 may have a smaller size.

Additionally, each of the temperature control units 12 and 13 is operable to output a constant current signal during a predetermined time within the molding cycle, independently of the current signal obtained based on the temperature difference. This means that each of the setting sections 14 and 15 is operable to supply a constant heating current to the hot nozzle 1. For example, during the step of preheating of the hot nozzle before starting the molding operation, the temperature control unit 12 outputs a constant current signal so as to provide constant heating current Ic as will be hereinafter explained. Further, each of the setting sections 14 and 15 is equipped with a timer which is operable to set a period of supplying such a constant heating current.

The changeover switch 18 is controlled to be switched in accordance with a signal from a control panel (not shown) of the injection molding machine. Such a control of the changeover switch 18 will now be explained with reference to FIGS. 2(a) and 2(b).

Figure 2A:
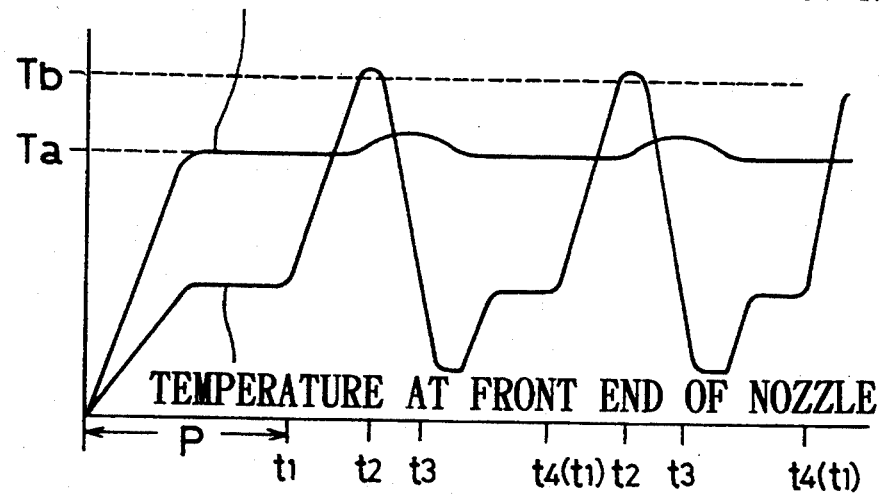
FIG. 2(a) is a graph showing change of nozzle temperature with respect to change of molding steps.
Figure 2B:
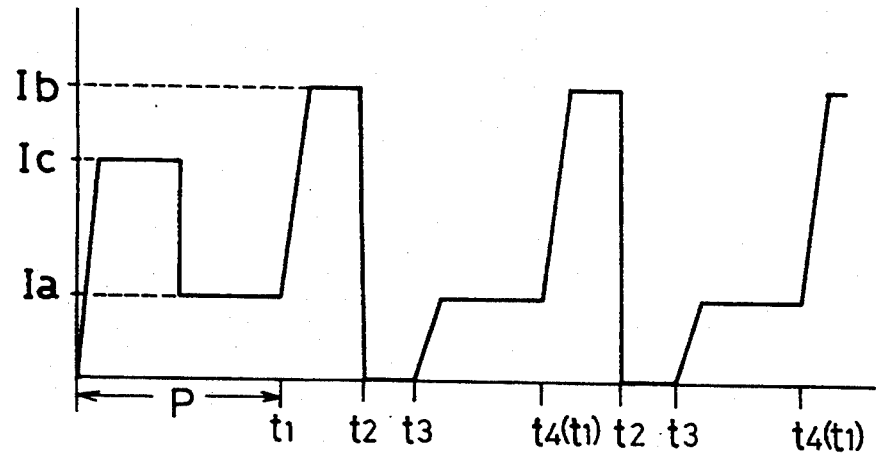
FIG. 2(b) is a graph showing change of heating current with respect to change of molding steps.

Firstly, during the preheating step before starting of the molding cycle (period P in FIG. 2(b)), the changeover switch 18 is switched to the temperature control unit 12, and the temperature control unit 12 compares the temperature detected by the thermocouple 10 at the central position of the nozzle portion 2 with set temperature Ta. However, at this stage, the hot nozzle 1 is in a cooled state, and therefore, the temperature control unit 12 does not output the current signal corresponding to the temperature difference but outputs the constant current signal corresponding to constant heating current Ic which is higher than the heating current obtained based on the temperature difference. The constant current signal for constant heating current Ic is kept to be outputted until the temperature of the hot nozzle 1 at its central position reaches set temperature Ta. After the temperature has reached set temperature Ta, heating current Ia based on the temperature difference is supplied to maintain set temperature Ta. At this stage, as shown in FIG. 2(a), the temperature at the front end of the nozzle portion 2 is lower than set temperature Ta because of the cooling effect by the mold 5.

When the mold 5 is started to be closed at timing t1 in FIG. 2(b), the changeover switch 18 is switched to the temperature control unit 13. Then, the temperature detected by the thermocouple 11 at the front end of the nozzle portion 2 is compared with set temperature Tb, so that the hot nozzle 1 is heated by the heating current corresponding to the temperature difference. After the temperature has reached set temperature Tb, heating current Ib is supplied to maintain set temperature Tb. The heating current is interrupted or reduced to zero by means of a timer at the same time when the injection process of the molten resin to the mold cavity 7 is finished at timing t2 in FIG. 2(b).

Thus, according to this embodiment, the front end of the nozzle portion 2 is heated to reach set temperature Tb which permits the molten resin injected from the molding machine to be smoothly flown into the cavity 7 without substantial pressure loss. On the other hand, after the injection process has been finished, the front end of the nozzle portion 2 is cooled by the mold 5, so that the molten resin within the front end of the nozzle portion 2 is solidified. Therefore, subsequent operations for opening the mold and for taking the product out of the mold can be performed without any problem, and cobwebbing or leakage of resin from the nozzle portion 2 can be prevented. Although no heating current is supplied after timing t2, the resin within the hot nozzle 1 other than the front end of the nozzle portion 2 is still melted, so that the temperature at the central position of the nozzle portion 2 is kept substantially at set temperature Ta as shown in FIG. 2(a).

At timing t3 immediately before completion of opening of the mold 5, the changeover switch 18 is switched to the temperature control unit 12 for preheating the solidified resin within the nozzle portion 2. To preheat the solidified resin, heating current Ic higher than the heating current determined based on the temperature difference as described above is to be supplied. However, after the molding cycle has been repeatedly performed by several times, the temperature at the central position of the nozzle 2 may exceed set temperature Ta because of the temperature of the molten resin within the nozzle 2 and the heat produced by shearing friction at a gate formed by the front end of the nozzle 2. Then, the temperature control unit 12 outputs the current signal corresponding to the temperature difference so as to provide the heating current lower than heating current Ic and thereafter maintains the temperature by heating current Ia as described above.

When the mold 5 is again closed at timing t4, the changeover switch 18 is switched from the temperature control unit 12 to the temperature control unit 13, and the hot nozzle 1 is heated by the heating current corresponding to the temperature difference. After the temperature has reached set temperature Tb, heating current Ib is supplied to maintain set temperature Tb in the same manner as described above. The heating current is interrupted or reduced to zero by means of the timer at the same time when the injection process of the molten resin to the mold cavity 7 is finished. Thus, the temperature control same as that from timings t1 to t4 (corresponding to one molding cycle) is repeatedly performed according to the molding process.

For the high cycle molding operation, based on the signal from the control panel of the molding machine, the power control unit 19 may directly supply an appropriate heating current to the hot nozzle 1 without intervening of the temperature control unit 13 to compensate for the time lag in the heating operation because of transmission of signal between the temperature control unit 13 and the power control unit 19, and the control based on the current signal from the temperature control unit 13 may be thereafter performed.

As described above, in the temperature control system of this embodiment, the control of temperature of the hot nozzle 1 is performed with the detected temperature at the front end of the nozzle portion 2 and the detected temperature at the central position being utilized for rapid heating and for keeping the temperature according to the various steps in the molding cycle. The temperature control of the hot nozzle 1 can therefore be accurately performed, so that the quality of the product can be improved.

Further, with the above embodiment, particularly in the temperature control unit 12, in order to preheat the hot nozzle 1 before starting the molding operation, the constant current signal for constant heating current Ic is supplied in place of the current signal which is determined based on the temperature difference. Further, such a constant heating current is changed to the heating current determined based on the temperature difference. Therefore, the molding operation can be effectively performed.

While the invention has been described with reference to a preferred embodiment, it is to be understood that modifications or variation may be easily made without departing from the spirit of this invention which is defined by the appended claims.

What is claimed is:

1. A temperature control device for a hot nozzle for use in a runner-less molding process of a plastic by an injection molding machine, the hot nozzle including a nozzle portion adapted to be inserted into a bore formed in a mold and communicating with a mold cavity, and a base portion for the flow of a molten resin of the plastic from the injection molding machine to the nozzle portion, the nozzle portion having a front end which contacts the mold cavity and a middle portion located between the front end of the nozzle portion and the base portion, the hot nozzle being divided substantially into two sections by a pair of slits which extend over the length of the hot nozzle except the front end of the nozzle portion, so that the nozzle portion can be heated through application of electric power between both sides of the base portion separated by the slits; said device comprising:

first temperature detecting means mounted on the front end of the nozzle portion for detecting the temperature of the hot nozzle at the front end thereof;

second temperature detecting means mounted on the middle portion of the nozzle portion for detecting the temperature of the hot nozzle at a position upstream of the front end;

control signal outputting means for comparing the temperature detected by said first and second temperature detecting means with a first set temperature and a second set temperature, respectively, and for outputting first and second control signals corresponding to the temperature differences therebetween, respectively;

power supply means connected to said control signal outputting means for supplying, to the base of the hot nozzle, a power for heating the hot nozzle in response to said first and second control signals; and switch means connected between said control signal outputting means and said power supply means and operable to selectively supply either one of said first and second temperature control signals to said power supply means according to the molding cycle of the molding machine.

2. The temperature control device as defined in claim 1, wherein said power supply means includes a power control unit, a power source and a transformer; wherein said power control unit is operable to regulate a power from said power source into the power corresponding to said first and second temperature control signals; and wherein said transformer transforms the power regulated by said power control unit into power having low voltage and high current.

3. The temperature control device as defined in claim 2, wherein said power control unit includes means for converting the power to be supplied to said transformer into power having high frequency, so that the size of said transformer is minimized.

4. The temperature control device as defined in claim 1, wherein said second temperature detecting means detects the temperature of the hot nozzle at substantially the central position of the nozzle portion in the longitudinal direction.

5. The temperature control device as defined in claim 1, wherein said control signal outputting means includes a first temperature control unit and a second temperature control unit connected to said first temperature detecting means and said second temperature detecting means, respectively; and wherein each of said first and second temperature control units includes setting means for setting a target temperature and calculation means for calculating heating current applied to the hot nozzle based on the detected temperature difference.

6. The temperature control device as defined in claim 5, wherein at least one of said first and second temperature control units is operable to output a predetermined constant control signal for providing a constant heating current to the hot nozzle during a predetermined period of the molding cycle, in place of the control signal obtained based on the temperature difference.

7. The temperature control device as defined in claim 6, wherein a timer is provided for setting said predetermined period.

8. The temperature control device as defined in claim 5, wherein said switch means is connected to a control panel of the injection molding machine; and said switch means is operable by a molding cycle signal outputted from the control panel.

* * * * *